US012620116B2

(12) United States Patent
Spivey et al.

(10) Patent No.: US 12,620,116 B2
(45) Date of Patent: May 5, 2026

(54) SYSTEMS AND METHODS FOR THE ACCURATE TRACKING OF ORBITAL OBJECTS

(71) Applicant: JASR Systems, LLC, Solana Beach, CA (US)

(72) Inventors: Brett Alverson Spivey, Carlsbad, CA (US); Christopher Sexton, San Diego, CA (US)

(73) Assignee: JASR Systems, LLC

( * ) Notice: Subject to any disclaimer, the term of this patent is extended or adjusted under 35 U.S.C. 154(b) by 341 days.

(21) Appl. No.: 18/085,796

(22) Filed: Dec. 21, 2022

(65) Prior Publication Data

US 2024/0212191 A1 Jun. 27, 2024

(51) Int. Cl.
| | |
|---|---|
| *G06T 7/70* | (2017.01) |
| *G06T 3/16* | (2024.01) |
| *G06T 3/60* | (2006.01) |
| *G06T 5/80* | (2024.01) |

(52) U.S. Cl.
CPC ................. *G06T 7/70* (2017.01); *G06T 3/16* (2024.01); *G06T 3/60* (2013.01); *G06T 5/80* (2024.01); *G06T 2207/10028* (2013.01)

(58) Field of Classification Search
CPC .... G06T 7/70; G06T 3/16; G06T 3/60; G06T 5/80; G06T 2207/10028; G02B 23/165
USPC ........................................................ 382/103
See application file for complete search history.

(56) References Cited

U.S. PATENT DOCUMENTS

| | | | | |
|---|---|---|---|---|
| 9,791,278 | B2 * | 10/2017 | McCroskey ....... | G01C 21/1656 |
| 10,180,327 | B1 * | 1/2019 | Lane ......................... | G06T 5/73 |
| 11,935,263 | B1 * | 3/2024 | Kurz ....................... | G06T 7/579 |
| 12,189,063 | B2 * | 1/2025 | Ozeki ................... | G01S 17/894 |
| 2013/0264463 | A1 * | 10/2013 | Martin ..................... | B64G 3/00 |
| | | | | 250/206.1 |
| 2021/0033400 | A1 * | 2/2021 | Belenkii ................ | G02B 23/04 |
| 2021/0049773 | A1 * | 2/2021 | Paxton ................... | G06T 7/248 |

FOREIGN PATENT DOCUMENTS

DE 202017101831 U1 * 4/2018 ............... B64G 3/00

OTHER PUBLICATIONS

GBOT—Ground Based Optical Tracking of the Gaia satellite (Year: 2011).*
Hasenohr, T. (2016) Initial Detection of Low Earth Orbit Objects Through Passive Optical Wide Angle Imaging Systems, (Conference: Deutscher Luft-und Raumfahrtkongress 2016).
Steindorfer, M. (2017) Stare and chase of space debris targets using real-time derived pointing data, (Advances in Space Research, vol. 60, Issue 6, 2017, p. 1201-1209).
(Continued)

*Primary Examiner* — Jennifer Mehmood
*Assistant Examiner* — Pardis Sohraby
(74) *Attorney, Agent, or Firm* — Clements Bernard Walker; Christopher L. Bernard

(57) ABSTRACT

The present disclosure achieves accurate tracking of sunlit orbital objects, including small, dim orbital debris, using a ground-based telescope and detector which tracks the orbital object. The angular position of the orbital object relative to background celestial objects is accurately determined over a trajectory, allowing accurate determination of the orbit parameters.

29 Claims, 2 Drawing Sheets

(56) References Cited

OTHER PUBLICATIONS

Wagner, P. (2021) APPARILLO: a fully functional and autonomous staring system for LEO debris detection, (CEAS Space Journal, vol. 14, 2022, p. 303-326).

Choi, J. (2018) Optical Tracking Data Validation and Orbit Estimation for Sparse Observations of Satellites by the OWL-Net, (Sensors, vol. 18, 2018, p. 1868).

Guo, X. (2020) Introduction to APOSOS project: 15 cm aperture electro-optical telescopes to track space objects, (Advances in Space Research, vol. 65, Issue 8, 2020, p. 1990-2002).

* cited by examiner

SYSTEMS AND METHODS FOR THE ACCURATE TRACKING OF ORBITAL OBJECTS

BACKGROUND

The present disclosure relates to accurate tracking of orbital objects. The primary motivation for accurate tracking is to predict more accurate conjunctions of orbital objects which may lead to a collision. In particular, accurate prediction of potential collisions between orbital debris and satellites may allow the satellite to divert and avoid the collision.

The present disclosure achieves accurate tracking of sunlit orbital objects, including small, dim orbital debris, using a ground-based telescope and detector which tracks the orbital object. The orbital object is sunlit, yet the sun is below the horizon. Objects in LEO have a short time window before the orbital object is eclipsed by the earth and no longer sunlit. At sunrise/sunset, the sky is still relatively bright, and the sky background creates noise in the detector. As the sun position becomes lower with respect to the horizon, the sky darkens, and the sky background creates less detector noise. The orbital object eventually becomes eclipsed by the earth and no longer sunlit. Lower altitude objects eclipse soonest after sunset and leave eclipse latest before sunrise, and so observing lower altitude objects is often accompanied by substantial sky background, requiring longer integration from the tracker to obtain adequate SNR.

Optical tracking of satellites or large orbital objects (>10 cm) is straightforward as the intensity of the object in the telescope image is relatively strong compared to the noise of the camera and background. Tracking smaller orbital objects (<10 cm) is more challenging as the object must be extracted from the noisy background.

SUMMARY

The present disclosure achieves accurate tracking of sunlit orbital objects, including small, dim orbital debris, using a ground-based telescope and detector which tracks the orbital object. The angular position of the orbital object relative to background celestial objects is accurately determined over a trajectory, allowing accurate determination of the orbit parameters.

Because the orbital object and the background celestial objects are detected simultaneously, the jitter due to the telescope tracking system can be removed. The motion of the orbital object relative to the stars and other celestial objects is used to compute the orbital parameters of the object.

The system may also include range measurements, using the same telescope with a laser or a separate ranging system.

The orbital object is sunlit, yet the sun is below the horizon. To track small orbital debris, which has a low signal return, the telescope is slewed to track the dim orbital object, allowing integration of the signal to obtain adequate signal-to-noise ratio (SNR). Prior art discusses telescopes which track the celestial background and observe the orbital object moving across the detector. The present disclosure instead tracks the orbital object and lets the celestial background move across the detector, so that one can integrate the orbital object signal to improve SNR, and thereby track the dimmest orbital objects.

The encoders on the telescope mount, combined with the position of the orbital object image on the detector, allows determination of the angular position vs. time of the orbital object. However, this determination of the angular position has some degree of angular error which we wish to improve. For example, thermal changes, wind loading, calibration errors, etc. can all lead to inaccuracies. The atmosphere also causes a prism effect which deflects the apparent angular position of the orbital object, this deflection angle depending on parameters such as atmospheric temperature profile, and thus creates additional angular errors.

Angular errors can be improved by observing celestial objects within the field of the camera as well as the tracked orbital object. The angular locations of these celestial objects are known with a high degree of accuracy. In addition, the prism effect of the atmosphere is cancelled by registering the orbital object position to the celestial background. By observing many of these celestial objects across the tracked trajectory, the present disclosure is also able to take advantage of fitting the orbital parameters to many independent measurements, thus reducing errors by ensemble averaging.

Particularly for low altitude orbital objects, the angular rate to track the object can be relatively high, resulting in a streaking of the background celestial objects due to the slewing of the telescope to track the orbital object. This streaking degrades the accuracy of the determination of the angular location of the celestial object in the direction of the streak. The present disclosure mitigates this streaking.

The present method ameliorates the streaking by using a high frame rate on the detector. The streak length is proportional to frame integration time. Higher frame rates thus lead to smaller streaks. The drawback to higher frame rates is that camera noise is accumulated every frame, so that high frame rate corresponds to larger integrated noise level. There are cameras, however, which have very low noise at high frame rate. For example, the Hamamatsu qCMOS array detector has very low noise (0.43e) at high frame rate (120 Hz for full field, higher frame rate for partial field).

An alternative way to ameliorate the streaking is to use a rotating chopper wheel, which applies a modulation to the transmitted intensity on the image. The chopped streak then changes from a continuous line to an intensity modulated line, for example a series of dots at regular or irregular spacing. The angular location of these dots can be determined much more accurately than the original unchopped streak.

In addition, the data coming from the camera may be analyzed in real-time so that the tracking system can update where the tracker is pointed to stay centered on the orbital object. With the tracker locked onto the orbital object the stars in the background will move within the telescope field of view (FOV).

In one illustrative embodiment, the present disclosure provides a system for tracking an orbital object, the system including: a telescope coupled to a tracking gimbal; a camera coupled to the telescope; wherein the telescope and the camera are collectively operable for acquiring image frames of a solar illuminated orbital object; and a memory and a processor coupled to the tracking gimbal and the camera and storing instructions executed to control the tracking gimbal to keep the solar illuminated orbital object in a field of view of the camera. The memory and the processor further store instructions executed to acquire the image frames at a focal plane of the telescope. Optionally, the memory and the processor further store instructions executed to perform data reduction of orbital object track data by accumulation in time of the image frames, first shifting the image frames a predetermined amount for the orbital object motion and then summing in time. Optionally, the memory and the processor further store instructions executed to perform data reduction of celestial background track data by accumulation in time of celestial background objects, first shifting the image frames a predetermined amount for background motion and then summing in time. The memory and the processor further store instructions executed to perform either or both of: spatial correlation of a celestial background image with calibrated celestial image data accurately registered in celestial coordinates via 2-D image correlation; or extracting center locations of celestial objects, then correlating extracted celestial background object locations with accurately registered celestial coordinates of those objects via point cloud image correlation. The memory and the processor further store instructions executed to use spatial correlation of celestial objects with calibrated celestial data to determine an accurate registration of a detector in celestial coordinates. The memory and the processor further store instructions executed to use knowledge of a registered detector location in celestial coordinates to determine an accurate location vs. time of the orbital object with respect to the celestial coordinates in angle-angle vs. time. Optionally, the memory and the processor further store instructions executed to determine a range to the orbital object by measuring time-of-flight of a laser pulse to the orbital object in range vs. time. Optionally, the memory and the processor further store instructions executed to use geometrical inversion to determine orbital parameters from corrected object angles vs. time in angle-angle vs. time data or angle-angle-range vs. time data.

In another illustrative embodiment, the present disclosure provides a method for tracking an orbital object, the method including: providing a telescope coupled to a tracking gimbal; providing a camera coupled to the telescope; wherein the telescope and the camera are collectively operable for acquiring image frames of a solar illuminated orbital object; and controlling the tracking gimbal to keep the solar illuminated orbital object in a field of view of the camera. The image frames are acquired at a focal plane of the telescope. Optionally, the method further includes performing data reduction of orbital object track data by accumulation in time of the image frames, first shifting the image frames a predetermined amount for the orbital object motion and then summing in time. Optionally, the method further includes performing data reduction of celestial background track data by accumulation in time of celestial background objects, first shifting the image frames a predetermined amount for background motion and then summing in time. The method further includes performing either or both of: spatial correlation of a celestial background image with calibrated celestial image data accurately registered in celestial coordinates via 2-D image correlation; or extracting center locations of celestial objects, then correlating extracted celestial background object locations with accurately registered celestial coordinates of those objects via point cloud image correlation. The method further includes using spatial correlation of celestial objects with calibrated celestial data to determine an accurate registration of a detector in celestial coordinates. The method further includes using knowledge of a registered detector location in celestial coordinates to determine an accurate location vs. time of the orbital object with respect to the celestial coordinates in angle-angle vs. time. Optionally, the method further includes determining a range to the orbital object by measuring time-of-flight of a laser pulse to the orbital object in range vs. time. Optionally, the method further includes using geometrical inversion to determine orbital parameters from corrected object angles vs. time in angle-angle vs. time data or angle-angle-range vs. time data.

In a further illustrative embodiment, the present disclosure provides a non-transitory computer-readable medium including instructions stored in a memory and executed by a processor to carry out steps for tracking an orbital object, the steps including: acquiring image frames of a solar illuminated orbital object; and controlling a tracking gimbal to keep the solar illuminated orbital object in a field of view of a camera and a telescope; wherein the image frames are acquired at a focal plane of the telescope. Optionally, the steps further include performing either or both of: data reduction of orbital object track data by accumulation in time of the image frames, first shifting the image frames a predetermined amount for the orbital object motion and then summing in time; and data reduction of celestial background track data by accumulation in time of celestial background objects, first shifting the image frames a predetermined amount for background motion and then summing in time. The steps further include performing either or both of: spatial correlation of a celestial background image with calibrated celestial image data accurately registered in celestial coordinates via 2-D image correlation; or extracting center locations of celestial objects, then correlating extracted celestial background object locations with accurately registered celestial coordinates of those objects via point cloud image correlation. The steps further include: using spatial correlation of celestial objects with calibrated celestial data to determine an accurate registration of a detector in celestial coordinates; and using knowledge of a registered detector location in celestial coordinates to determine an accurate location vs. time of the orbital object with respect to the celestial coordinates in angle-angle vs. time. Optionally, the steps further include determining a range to the orbital object by measuring time-of-flight of a laser pulse to the orbital object in range vs. time. Optionally, the steps further include using geometrical inversion to determine orbital parameters from corrected object angles vs. time in angle-angle vs. time data or angle-angle-range vs. time data.

BRIEF DESCRIPTION OF THE DRAWINGS

The present disclosure is illustrated and described herein with reference to the various drawings in which like reference numbers are used to denote like system components/method steps, as appropriate, and in which.

DETAILED DESCRIPTION

Figure 1:
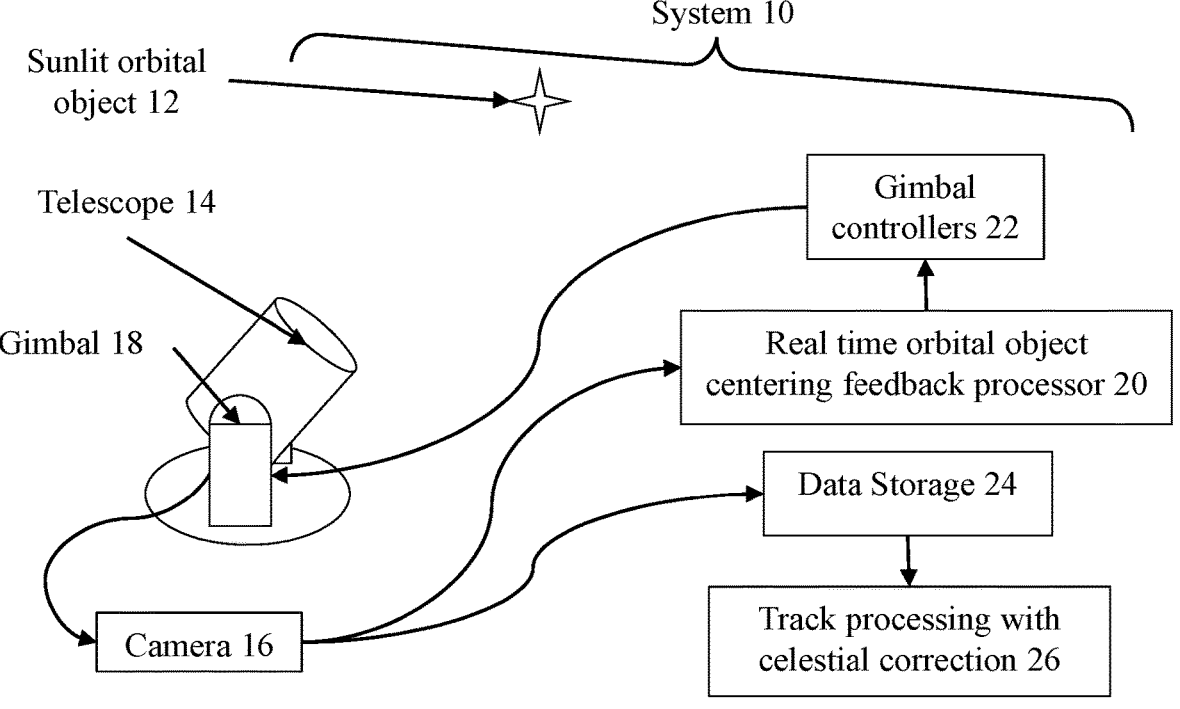
FIG. 1 is a schematic diagram illustrating one embodiment of the system of the present disclosure.

The present disclosure achieves accurate tracking of sunlit orbital objects, including small, dim orbital debris, using a ground-based telescope and detector which tracks the orbital object. The angular position of the orbital object relative to the celestial background is accurately determined over a trajectory, allowing accurate determination of the orbit parameters.

The system and method perform the following tasks:

acquiring image frames of data on a camera at the focal plane of a telescope which is tracking an orbital object, optional data reduction of the orbital object track data by accumulation in time of the orbital object, first shifting the image frames the appropriate amount for the orbital object motion and then summing in time, optional data reduction of the celestial background track data by accumulation in time of celestial background objects, first shifting the image frames the appropriate amount for the background motion and then summing in time, either:

spatial correlation of the celestial background image with calibrated celestial image data accurately registered in celestial coordinates (2-D image correlation), or extracting the center locations of the celestial objects, then correlation of extracted celestial background object locations with accurately registered celestial coordinates of those objects (point cloud image correlation), use of the spatial correlation of the celestial objects with the calibrated celestial data to determine the accurate registration of the detector in celestial coordinates, use of the knowledge of the registered detector location in celestial coordinates to determine the accurate location vs. time of the orbital object with respect to celestial coordinates (angle-angle vs. time), optionally determine the range to the orbital object by measuring time-of-flight of a laser pulse to the orbital object (range vs. time), and use of geometrical inversion to determine orbital parameters from the corrected object angles vs. time (angle-angle vs. time data or angle-angle-range vs. time data).

By including range information, the accuracy of the determination of orbital parameters is improved.

In an illustrative embodiment, preprocessing can optionally be implemented to decrease the computational burden. The preprocessing combines frames in time from contiguous sets of frames. The sets of image frames are accumulated together in time by shifting spatially before accumulating in two different ways: one to stack the orbital object, and one to stack the background celestial objects.

Since the telescope and mount are moving approximately along the trajectory of the orbital object, the motion of the orbital object on the detector is slower than the background celestial objects. If tracking were perfect, the orbital object would remain in the same position on the detector, and one could just accumulate frames in time. The present disclosure, however, allows for imperfect pointing of the telescope due to factors such as pointing jitter. In that case, one can use any knowledge of this pointing error to compute positional lateral shifts in the individual images of the orbital object for each frame before accumulation in time. This is commonly called shift-and-add.

There are potentially multiple sources of knowledge of these pointing errors. One source is the encoders on the telescope gimbal. Another source is deviation of celestial background objects that happen to be in the image frame from their expected positions.

The celestial background objects also can be accumulated using shift-and-add. The celestial background objects move faster across the detector array, so the spatial offsets that are applied are larger than for the orbital object.

For longer accumulation across more frames, there can also be an image rotation caused by the geometry of the telescope gimbals. In this case, the images are shifted and additionally rotated the appropriate amount before accumulating.

The celestial background frames are compared with the known truth celestial background to determine the true pointing of the detector with respect to celestial angular coordinates. The most mathematically straightforward way to perform the comparison is to form a 2-D correlation of the celestial image data with a truth image. This operation is sometimes implemented using fast Fourier transform, which can be more efficient depending on the size of the output correlation array. The interpolated peak of the correlation gives the offset of the images with sub-pixel accuracy.

The celestial background truth image can be in the form of a large database of intensity vs. celestial angle for the entire celestial sphere. Alternatively, the truth image can be reconstituted from a list of celestial object locations and the intensity of those objects. This form of data is often referred to as 'point-cloud'. The point-cloud form is a smaller, easier to manage database.

An alternative to the 2-D image correlation is to first form a point-cloud of the celestial objects from the acquired data, and then use a point-cloud-based correlation algorithm to find the offsets from the truth celestial point-cloud vs. the measured point-cloud. Algorithms to perform this are well known, such as the MATLAB pcregistercorr function.

The orbital parameters can be extracted from accurate object angle vs. time over a trajectory. Long trajectories produce smaller errors than short trajectories. The predominant errors in the reconstituted trajectory are in the range direction from the telescope.

The range errors can be optionally reduced by including a laser ranging system to measure time of flight from the orbital object.

There are several choices for telescope optics. The telescope of choice would be a short focal length telescope commonly known as an astrograph. These are available commercially at sub-1 meter size. Relatively short focal length is preferred since it increases the angular field of view, allowing more celestial background objects for reference; and it concentrates the light from each object onto fewer pixels, improving the signal to noise ratio in the presence of camera noise.

Pointing gimbals for the telescope that are fast enough to track orbital objects are available commercially for telescopes up to 1 meter diameter.

The correlation computation need not be carried out in real time, as the accurate orbit can be computed after the orbital object has passed.

Referring now specifically to FIG. 1, the system 10 of the present disclosure operates at twilight and later, at which time the sky is reasonably dark, but the orbital object 12 is still solar illuminated. A telescope 14 is coupled to one or more cameras 16. The telescope 14 is mounted on a tracking gimbal 18 which tracks the orbital object 12 well enough to keep it in the camera's FOV, and preferably keeps the orbital object 12 well centered in its FOV. The output from the camera 16 is processed using standard techniques on a standard processor 20 to provide feedback to the gimbal controllers 22 to keep the orbital object 12 centered. The camera data is stored in a memory 24 for later processing. The celestial correction processor 26 is preferably a standard CPU or GPU with software for performing the celestial correlation and angle correction algorithms. The output is the angle of the orbital object 12 vs. time along the orbital object tracked path in corrected, accurate celestial angular coordinates.

The generic type of telescope 14 that is best suited for this task is called an astrograph, which has good imaging performance over a wide field of view and low f-number. A field of view of 3° or the like is desired, in a 35 to 65 cm telescope. Astrographs of the Rowe-Ackermann Schmidt type are available in 8 in, 11 in, and 14 in sizes, etc. Astrographs of the Hamilton type also have good performance, and a 65 cm version built to search for comets could be used for this application. All of these are suitable for this application, as are any comparable telescopes 14.

The camera/detector 16 that is preferred is a qCMOS detector or the like due to its extremely low read noise (0.43 electrons) and high output rate (>1 Gigapixel/s). This set of specs allows tracking at the very highest speeds required for lowest altitude orbital objects, while suffering low penalty for digitally integrating higher altitude orbital objects. The camera 16 may be operated in windowed mode, either 512×4096 or 256×4096, for example. The camera 16 is capable of up to 532 frames per second in these modes. The optimum frame rate depends on the sky background level and orbital object size but is typically >100 Hz.

Figure 2:
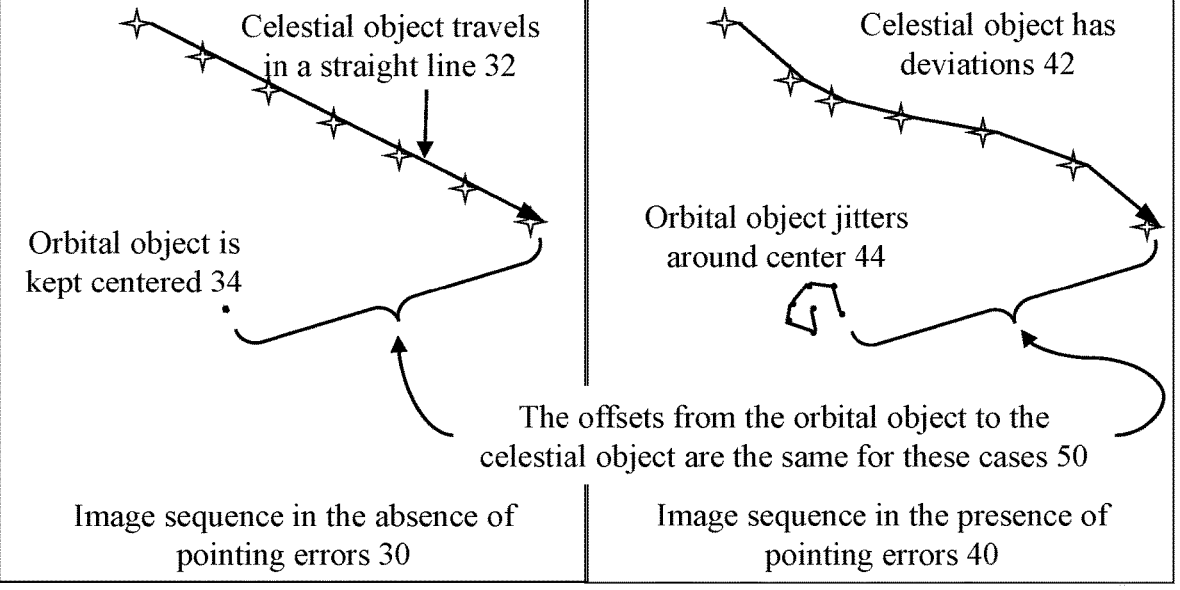
FIG. 2 is a schematic diagram illustrating that pointing errors produce the same image offsets for the orbital object and celestial objects.

FIG. 2 depicts on the left 30 the image sequence expected in the absence of any pointing errors. In that case, the celestial objects 32 would move in a straight line, and the camera would keep the orbital object 34 centered. FIG. 2 on the right 40 depicts the image sequence in the presence of pointing errors. In that case, the celestial objects 42 now deviate from a straight line, and the orbital object 44 now jitters around the center of the camera. However, the relative displacement vs. time 50 of the orbital object with respect to the celestial objects is not affected by the jitter. This allows using the deviations of the celestial object 42 to correct the location of the orbital object 44 in subsequent processing.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A system for tracking an orbital object, the system comprising:

a ground-based telescope coupled to a tracking gimbal;

a camera coupled to the telescope;

wherein the telescope and the camera are collectively operable for acquiring image frames of a solar illuminated orbital object tracked by the telescope and the camera; and a memory and a processor coupled to the camera storing instructions executed to determine a location of the orbital object within the camera field vs. time;

wherein the memory and the processor further store instructions executed to compare an observed orientation of celestial background objects in the camera field while the solar illuminated orbital object is tracked by the telescope and the camera with an accurately registered database of true celestial background data;

wherein the memory and the processor further store instructions executed to use the comparison of the observed orientation of the celestial background objects with the true celestial background data to correct the orbital object's determined location vs. time; and wherein the solar illuminated orbital object moves with respect to the celestial background objects in the camera field and the tracking gimbal of the telescope is locked onto the solar illuminated orbital object and moves with the solar illuminated orbital object in real time.

2. The system of claim 1, wherein the camera operates at high enough frame rate to ameliorate streaking of celestial background images.

3. The system of claim 1, wherein optical input to the camera is intensity modulated to break up celestial background streaks into a spatial pattern on the camera.

4. The system of claim 1, wherein the memory and the processor further store instructions executed to control the tracking gimbal to keep the solar illuminated orbital object in a field of view of the camera.

5. The system of claim 1, wherein the memory and the processor further store instructions executed to perform data reduction of orbital object track data by accumulation in time of the image frames, first shifting the image frames a predetermined amount for the orbital object motion and then summing in time.

6. The system of claim 1, wherein the memory and the processor further store instructions executed to perform data reduction of celestial background track data by accumulation in time of celestial background objects, first shifting the image frames a predetermined amount for background motion and then summing in time.

7. The system of claim 1, wherein the memory and the processor further store instructions executed to perform either or both of:

spatial correlation of the celestial background images with accurately registered database celestial image data via 2-D image correlation; and extracting center locations of celestial objects, then correlating extracted celestial background object locations with accurately registered database celestial object locations via point cloud image correlation.

8. The system of claim 1, wherein the memory and the processor further store instructions executed to determine both offset and image rotation of the celestial objects with respect to an accurately registered celestial object database.

9. The system of claim 1, wherein the memory and the processor further store instructions executed to use geometrical inversion to convert the orbital object celestial locations vs. time into orbital parameters of the orbital object.

10. The system of claim 1, wherein the system further comprises a laser and detector to measure round-trip time-of-flight of a laser pulse to the orbital object, to determine range vs. time.

11. The system of claim 10, wherein the memory and the processor further store instructions executed to use geometrical inversion to convert the orbital object celestial locations and range vs. time into orbital parameters of the orbital object.

12. A method for tracking an orbital object, the method comprising:

providing a ground-based telescope coupled to a tracking gimbal;

providing a camera coupled to the telescope;

wherein the telescope and the camera are collectively operable for acquiring image frames of a solar illuminated orbital object tracked by the telescope and the camera;

determining a location of the orbital object within a camera field vs. time;

comparing an observed orientation of celestial background objects in the camera field while the solar illuminated orbital object is tracked by the telescope and the camera with an accurately registered database of true celestial background data; and using the comparison of the observed orientation of the celestial background objects with the true celestial background data to correct the orbital object's determined location vs. time;

wherein the solar illuminated orbital object moves with respect to the celestial background objects in the camera field and the tracking gimbal of the telescope is locked onto the solar illuminated orbital object and moves with the solar illuminated orbital object in real time.

13. The method of claim 12, wherein the camera operates at high enough frame rate to ameliorate streaking of the celestial background images.

14. The method of claim 12, wherein optical input to the camera is intensity modulated to break up celestial background streaks into a spatial pattern on the camera.

15. The method of claim 12, wherein camera data is used to control the tracking gimbal to keep the solar illuminated orbital object in a field of view of the camera.

16. The method of claim 12, further comprising performing data reduction of orbital object track data by accumulation in time of the image frames, first shifting the image frames a predetermined amount for the orbital object motion and then summing in time.

17. The method of claim 12, further comprising performing data reduction of celestial background track data by accumulation in time of celestial background objects, first shifting the image frames a predetermined amount for background motion and then summing in time.

18. The method of claim 12, further comprising performing either or both of:

spatial correlation of the celestial background images with accurately registered database celestial image data via 2-D image correlation; and extracting center locations of celestial objects, then correlating extracted celestial background object locations with accurately registered database celestial object locations via point cloud image correlation.

19. The method of claim 12, further comprising determining both offset and image rotation of the celestial objects with respect to an accurately registered celestial object database.

20. The method of claim 12, further comprising using geometrical inversion to convert the orbital object celestial locations vs. time into orbital parameters of the orbital object.

21. The method of claim 12, further comprising providing a laser and detector to measure round-trip time-of-flight of a laser pulse to the orbital object, to determine range vs. time.

22. The method of claim 21, further comprising using geometrical inversion to convert the orbital object celestial locations and range vs . . . time into orbital parameters of the orbital object.

23. A non-transitory computer-readable medium comprising instructions stored in a memory and executed by a processor to carry out steps for tracking an orbital object, the steps comprising:

acquiring image frames of a solar illuminated orbital object tracked with a ground-based telescope and a camera;

determining a location of the orbital object within a camera field vs. time;

comparing an observed orientation of celestial background objects in the camera field while the solar illuminated orbital object is tracked by the telescope and the camera with an accurately registered database of true celestial background data; and using the comparison of the observed orientation of the celestial background objects with the true celestial background data to correct the orbital object's determined location vs. time;

wherein the solar illuminated orbital object moves with respect to the celestial background objects in the camera field and the tracking gimbal of the telescope is locked onto the solar illuminated orbital object and moves with the solar illuminated orbital object in real time.

24. The non-transitory computer readable medium of claim 23, the steps further comprising performing either or both of:

data reduction of orbital object track data by accumulation in time of the image frames, first shifting the image frames a predetermined amount for the orbital object motion and then summing in time; and data reduction of celestial background track data by accumulation in time of celestial background objects, first shifting the image frames a predetermined amount for background motion and then summing in time.

25. The non-transitory computer readable medium of claim 23, the steps further comprising performing either or both of:

spatial correlation of the celestial background images with accurately registered database celestial image data via 2-D image correlation; and extracting center locations of celestial objects, then correlating extracted celestial background object locations with accurately registered database celestial object locations via point cloud image correlation.

26. The non-transitory computer readable medium of claim 23, the steps further comprising performing determination of both offset and image rotation of the celestial objects with respect to an accurately registered celestial object database.

27. The non-transitory computer readable medium of claim 23, the steps further comprising performing geometrical inversion to convert the orbital object celestial locations vs. time into orbital parameters of the orbital object.

28. The non-transitory computer readable medium of claim 23, the steps further comprising determining a range to the orbital object by measuring round-trip time-of-flight of a laser pulse to the orbital object in range vs. time.

29. The non-transitory computer readable medium of claim 28, the steps further comprising performing geometrical inversion to convert the orbital object celestial locations and range vs. time into orbital parameters of the orbital object.

\* \* \* \* \*